(12) United States Patent
Dawes et al.

(10) Patent No.: US 9,873,629 B2
(45) Date of Patent: Jan. 23, 2018

(54) METHODS FOR PRODUCING OPTICAL FIBER PREFORMS WITH LOW INDEX TRENCHES

(75) Inventors: Steven Bruce Dawes, Corning, NY (US); Robert A Knowlton, Wellsboro, PA (US); Pushkar Tandon, Painted Post, NY (US); Ji Wang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 324 days.

(21) Appl. No.: 13/173,777

(22) Filed: Jun. 30, 2011

(65) Prior Publication Data

US 2013/0000840 A1    Jan. 3, 2013

(51) Int. Cl.
C03B 37/018    (2006.01)
C03B 37/012    (2006.01)
C03B 37/014    (2006.01)

(52) U.S. Cl.
CPC .. C03B 37/01211 (2013.01); C03B 37/01446 (2013.01); C03B 37/01453 (2013.01); C03B 37/01466 (2013.01); C03B 2201/12 (2013.01); C03B 2203/22 (2013.01); C03B 2207/36 (2013.01); C03B 2207/66 (2013.01); C03B 2207/70 (2013.01)

(58) Field of Classification Search
CPC ............... C03B 37/01453; C03B 37/01211
USPC .................................. 65/421, 397, 412
See application file for complete search history.

(56) References Cited

U.S. PATENT DOCUMENTS

| 3,932,162 | A | * | 1/1976 | Blankenship ............... 65/421 |
| 4,518,407 | A | * | 5/1985 | Black et al. ................ 65/412 |
| 4,620,861 | A | * | 11/1986 | Berkey ........................ 65/399 |
| 4,627,867 | A | * | 12/1986 | Tanaka et al. .............. 65/421 |

(Continued)

FOREIGN PATENT DOCUMENTS

| GB | 1456371 | 11/1976 |
| WO | 98/33746 | 8/1998 |

OTHER PUBLICATIONS

Chinese First Office Action 201280031881.2 dated May 26, 2015.
International Search Report and Written Opinion PCT/US2012/041578 dated Dec. 10, 2012.

*Primary Examiner* — John Hoffmann
(74) *Attorney, Agent, or Firm* — Svetlana Z. Short; Anthony L. Pisano

(57) ABSTRACT

Methods for forming optical fiber preforms with low-index trenches are disclosed. According to one embodiment, the method includes depositing silica-based glass soot on a bait rod to form a low-index trench region of the optical fiber preform. The silica-based glass soot is deposited such that the low-index trench region has a first density. Thereafter a barrier layer having a second density greater than the first density is formed around the low-index trench region. Thereafter, an overclad region is deposited around the barrier layer. The bait rod is then removed from a central channel of the trench-overclad assembly. A separate core assembly is inserted into the central channel. A down-dopant gas is then directed through the central channel of the trench-overclad assembly as the trench-overclad assembly is heated to dope the low-index trench region. The barrier layer prevents diffusion of the down-dopant from the low-index trench region into the overclad region.

21 Claims, 6 Drawing Sheets

(56) References Cited

U.S. PATENT DOCUMENTS

| | | | |
|---|---|---|---|
| 4,629,485 A * | 12/1986 | Berkey | 65/398 |
| 4,648,891 A * | 3/1987 | Abe | 65/412 |
| 4,668,263 A * | 5/1987 | Yokota et al. | 65/412 |
| 4,749,396 A * | 6/1988 | Hicks, Jr. | 65/412 |
| 4,772,302 A | 9/1988 | Abe | |
| 4,834,786 A * | 5/1989 | Yamauchi | C03B 37/0142 427/167 |
| 5,000,773 A * | 3/1991 | Le Noane et al. | 65/391 |
| 5,342,597 A * | 8/1994 | Tunison, III | 423/335 |
| 5,641,333 A * | 6/1997 | Burke et al. | 65/17.4 |
| 5,917,109 A * | 6/1999 | Berkey | 65/412 |
| 6,189,342 B1 * | 2/2001 | Berkey | 65/412 |
| 6,690,868 B2 * | 2/2004 | Anderson et al. | 385/123 |
| 6,883,351 B2 * | 4/2005 | Berkey | C03B 37/01466 65/421 |
| 6,928,841 B2 * | 8/2005 | Wu | 65/429 |
| 7,058,269 B2 * | 6/2006 | Caron | 385/123 |
| 7,089,766 B2 * | 8/2006 | Burke et al. | 65/414 |
| 7,603,015 B2 | 10/2009 | Bickham et al. | |
| 7,620,282 B2 | 11/2009 | Bickham et al. | |
| 2003/0046960 A1 | 3/2003 | Dawes et al. | |
| 2003/0200771 A1 | 10/2003 | Burke et al. | |
| 2008/0013901 A1 | 1/2008 | Kim et al. | |
| 2008/0260339 A1 | 10/2008 | Barish et al. | |
| 2009/0169163 A1 | 7/2009 | Abbott, III et al. | |
| 2010/0034998 A1 * | 2/2010 | Schoetz et al. | 428/34.4 |

* cited by examiner

METHODS FOR PRODUCING OPTICAL FIBER PREFORMS WITH LOW INDEX TRENCHES

BACKGROUND

Field

The present specification generally relates to optical fibers and, more specifically, to methods for making optical fiber preforms with low-index trenches.

Technical Background

Optical fibers with low-index trenches surrounding the core of the optical fiber may have improved bending performance and/or larger effective areas relative to comparable optical fibers which are formed without a low-index trench. Accordingly, the improved optical and physical properties of such fibers make them desirable for use in a variety of applications.

However, the formation of the low-index trench around the core of the optical fiber adds additional steps to the process of making an optical fiber preform and, as a result, adds significant costs to the process of making an optical fiber. Specifically, the low-index trench is formed by depositing silica-based glass around the core portion of the optical fiber and doping the silica-based glass with a down-dopant which decreases the index of refraction of the silica-based glass relative to the core portion of the optical fiber. However, to prevent the contamination of adjacent portions of the preform with the down-dopant, the low-index trench is separately formed and consolidated directly on the core portion of the optical fiber after the core portion has been consolidated and prior to depositing the overclad portion of the fiber. Specifically, the core portion of the optical fiber preform is first formed and consolidated to solid glass. Thereafter, the low-index trench portion is deposited around the core portion and then doped and consolidated in a separate step to prevent the dopant from diffusing into the core portion and the overclad portion. Finally, the overclad is formed around the low-index trench layer and consolidated in yet another step.

Accordingly, a need exists for alternative methods of forming an optical fiber preform comprising a low-index trench region surrounding the core portion.

SUMMARY

According to one embodiment, a method for forming an optical fiber preform includes depositing silica-based glass soot on a bait rod to form a low-index trench region of the optical fiber preform. The silica-based glass soot may be deposited such that the low-index trench region has a first density and is initially substantially free from any dopant materials. A barrier layer of silica-based glass soot may then be around the low-index trench region. The barrier layer may have a second density greater than the first density. Silica-based glass soot may then be deposited around the barrier layer to form an overclad region of the optical fiber preform thereby forming a trench-overclad assembly. The bait rod may then be removed from a central channel of the trench-overclad assembly and a separately formed core assembly inserted into the central channel. A precursor gas comprising a down-dopant may then be directed through the central channel of the trench-overclad assembly as the trench-overclad assembly is heated to dope the low-index trench region with the down-dopant, wherein the barrier layer prevents diffusion of the down-dopant from the low-index trench region into the overclad region.

In another embodiment, a method for forming an optical fiber preform includes reacting silica-based glass precursor materials in a flame of a gas-fed burner as the flame is traversed over a bait rod in an axial direction at a first speed thereby depositing silica-based glass soot on the bait rod and forming a low-index trench region of the optical fiber preform, wherein the flame of the gas-fed burner has a first temperature, the low-index trench region has a first density, and the low-index trench region is initially substantially free from any dopants. Thereafter a temperature of the flame of the gas-fed burner may be increased to a second temperature and a traverse speed of the gas-fed burner decreased to a second speed as the flame of the gas-fed burner is traversed over the bait rod thereby forming a barrier layer of silica-based glass soot around the low-index trench region, wherein the barrier layer has a second density greater than the first density. Silica-based glass soot may then be deposited on the barrier layer to form an overclad region of the optical fiber preform to form a trench-overclad assembly of the optical fiber preform.

In yet another embodiment, a method for forming an optical fiber preform includes reacting silica-based glass precursor materials in a flame of a gas-fed burner as the flame is traversed over the bait rod in an axial direction at a first speed thereby depositing silica-based glass soot on the bait rod and forming a low-index trench region of the optical fiber preform, wherein a flame of the gas-fed burner has a first temperature, the low-index trench region has a first density, the low-index trench region is initially substantially free from any dopants. Thereafter, a temperature of the flame of the gas-fed burner is increased to a second temperature and a concentration of the silica-based glass precursor materials supplied to the gas-fed burner is decreased as the flame of the gas-fed burner is traversed over the bait rod thereby forming a barrier layer of silica-based glass soot around the low-index trench region, wherein the barrier layer has a second density greater than the first density. Silica-based glass soot may then be deposited on the barrier layer to form an overclad region of the optical fiber preform to form a trench-overclad assembly of the optical fiber preform.

Additional features and advantages of the methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 3A:
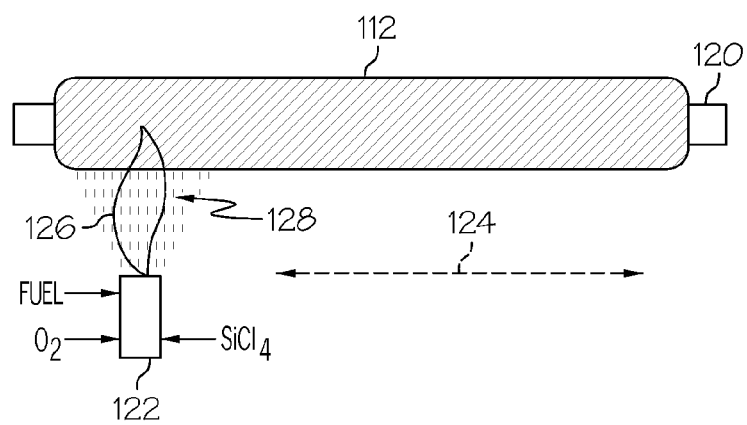
FIGS. 3A-3C schematically depict the formation of a trench-overclad assembly of an optical fiber preform.
Figure 3B:
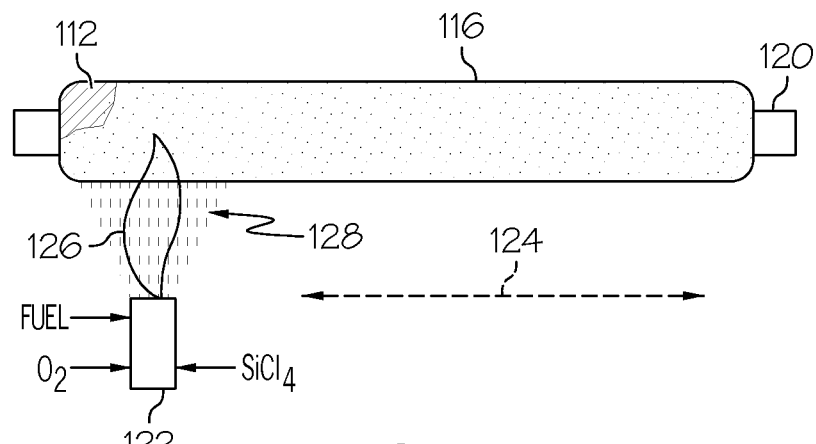
Figure 3C:
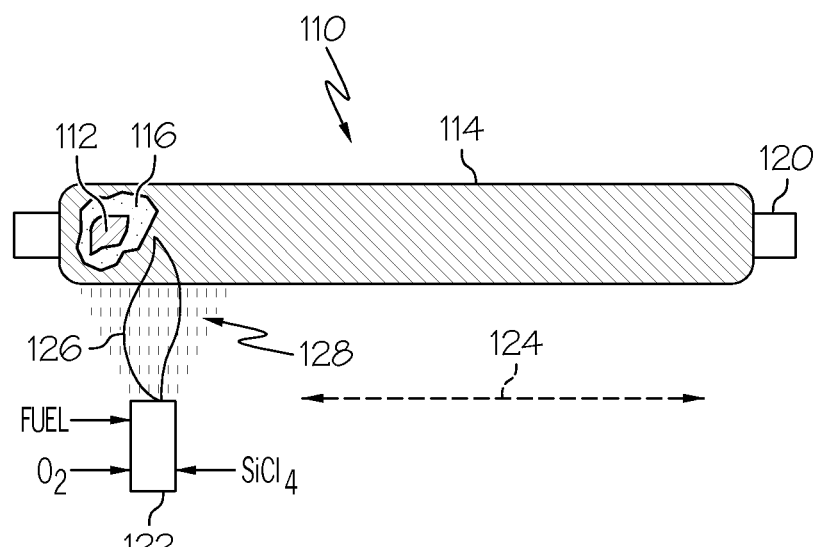

Reference will now be made in detail to embodiments of methods for forming optical fiber preforms with low-index trenches, examples of which are illustrated in the accompanying drawings. Whenever possible, the same reference numerals will be used throughout the drawings to refer to the same or like parts. One embodiment of the method for forming an optical fiber preform is schematically depicted in FIGS. 3A-3C. The method generally includes forming a trench-overclad assembly on a bait rod by: depositing silica-based glass soot which is initially substantially free from dopants on a bait rod to form a low-index trench region with a first density; forming a barrier layer around the low-index trench region such that the barrier layer has a second density greater than the first density; and depositing silica-based glass soot on the barrier layer to form an overclad region. Thereafter, the bait rod is removed from the assembly and the assembly is consolidated and the low-index trench region is doped with a down-dopant to decrease the index of refraction of the low-index trench region. Methods of forming the optical fiber preform and optical fiber preforms formed according to the method will be described in more detail herein with specific reference to the appended figures.

The following terminology will be used herein to described the optical fiber preforms and optical fibers drawn therefrom:

The term "refractive index profile," as used herein, is the relationship between the refractive index or the relative refractive index and the radius of the fiber.

The term "relative refractive index," as used herein, is defined as:

$$\Delta(r)\% = 100 \times [n(r)^2 - n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica-based glass. In another aspect, $n_{REF}$ is the maximum refractive index of the cladding. As used herein, the relative refractive index is represented by $\Delta$ and its values are given in units of "%," unless otherwise specified.

In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, undoped $SiO_2$. The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of $\Delta$ which is in units of "%," where r is the radius and which follows the equation, $$\Delta = \Delta_0 \left[1 - \left(\frac{r}{r_0}\right)^\alpha\right],$$

where $\Delta_0$ is the maximum relative refractive index, $r_0$ is the radius of the core, r is in the range $r_i \leq r \leq r_f$, $\Delta$ is as defined above, $r_i$ is the initial point of the α-profile, $r_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of 2.0 at one or more points in the core, as well as profiles with minor variations and/or a centerline dip.

Figure 1A:
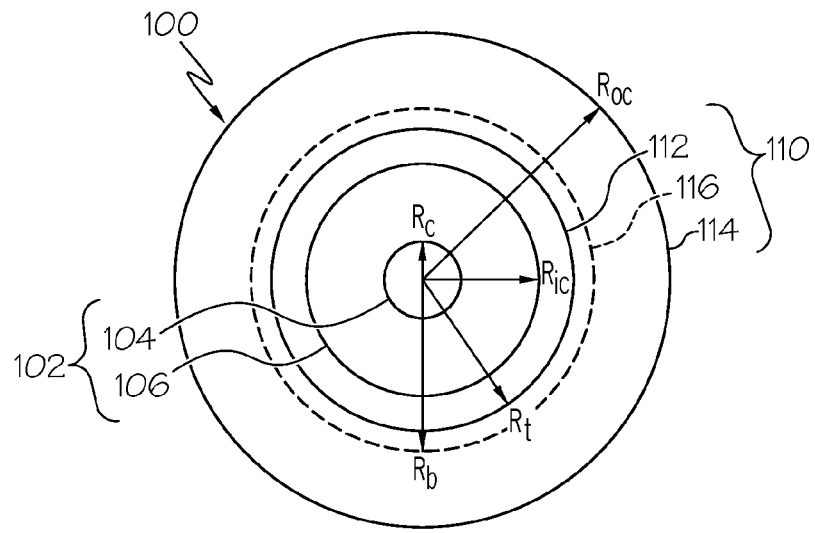
FIG. 1A schematically depicts a cross section of an optical fiber preform according to one or more embodiments shown and described herein.

Referring to FIG. 1A, a cross section of an optical fiber preform 100 according to one or more embodiments described herein is schematically depicted. The optical fiber preform 100 generally comprises a core assembly 102 (also referred to herein as a "core structure") which is positioned within a trench-overclad assembly 110 (also referred to herein as a "trench-overclad structure"). In the embodiment of the optical fiber preform shown in FIG. 1A, the core assembly 102 generally comprises a core region 104 and an inner clad region 106. The core region 104 is surrounded by and in direct contact with the inner clad region 106. In the embodiments shown and described herein, the core region 104 and the inner clad region 106 are formed from silica, specifically silica-based glass. The optical fiber preform 100 is generally circular-symmetric with respect to the center of the core region 104 and the core region 104 may have a radius $R_c$. The inner clad region 106 surrounds the core region 104 and extends from the radius $R_c$ to the radius $R_{ic}$ such that the inner clad region 106 has a radial thickness $T_{ic} = R_{ic} - R_c$. The core region 104 and the inner clad region 106 are generally formed with specific radial dimensions such that an optical fiber having the desired radial dimensions can be drawn from the optical fiber preform 100.

Figure 1B:
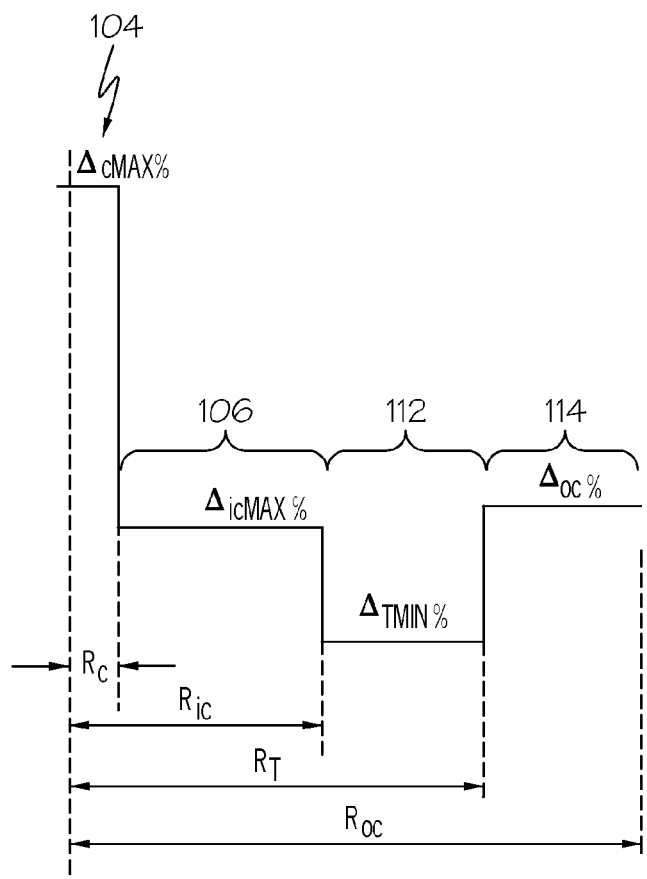
FIG. 1B schematically depicts a relative refractive index profile of the optical fiber preform of FIG. 1A according to one embodiment shown and described herein.
Figure 1C:
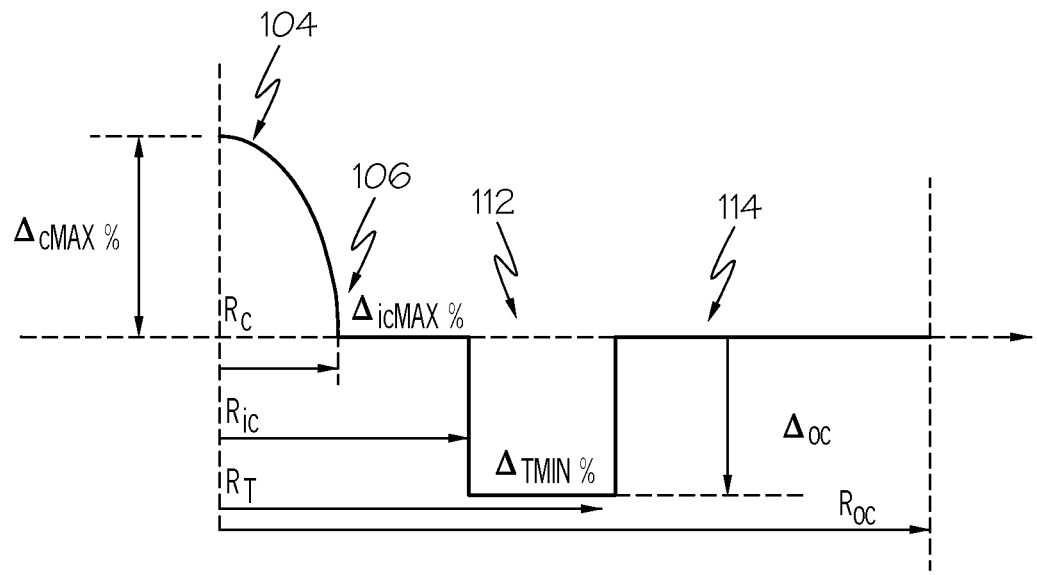
FIG. 1C schematically depicts a relative refractive index profile of the optical fiber preform of FIG. 1A according to another embodiment shown and described herein.

In the embodiments described herein, the core region 104 may have a step index refractive index profile or a graded index profile (i.e., an alpha profile). For example, in one embodiment, the core region 104 has a step index profile, as is schematically depicted in FIG. 1B. In these embodiments, the core region 104 has a maximum relative refractive index $\Delta_{cMAX}\%$ relative to the inner clad region 106 which is substantially uniform through a radial cross section of the core region 104. In other embodiments, the core region 104 may have a graded refractive index with an alpha profile as depicted in FIG. 1C such that the relative refractive index decreases from the center of the core region 104 to the radius $R_c$.

The core region 104 may be formed from pure silica-based glass ($SiO_2$), such as when the optical fiber preform has a step index of refraction similar to that depicted in FIG. 1B. Alternatively, the core region 104 of the optical fiber preform 100 may be formed from silica-based glass with one or more dopants which increases the index of refraction of the glass core region relative to pure, undoped silica-based glass, such as when the optical fiber preform 100 has a step index profile as depicted in FIG. 1B or a graded index profile as depicted in FIG. 1C. Suitable up-dopants for increasing the index of refraction of the core region include, without limitation, $GeO_2$, $Al_2O_3$, $P_2O_5$, $TiO_2$, $ZrO_2$, $Nb_2O_5$, $Ta_2O_5$, Cl and/or combinations thereof.

In the embodiments described herein, the inner clad region 106 has a maximum relative refractive index percent $\Delta_{icMAX}\%$ relative to pure silica-based glass such that $\Delta_{cMAX}\% > \Delta_{icMAX}\%$. The inner clad region 106 may be formed from pure silica-based glass ($SiO_2$), silica-based glass with one or more up-dopants which increase the index of refraction (e.g., $GeO_2$, $Al_2O_3$, $P_2O_5$, $TiO_2$, $ZrO_2$, $Nb_2O_5$, Cl and/or $Ta_2O_5$), such as when the inner clad region 106 is "up-doped," or silica-based glass with a down-dopant which decreases the index of refraction, such as fluorine, boron or the like, such as when the inner cladding is "down-doped," so long as the maximum relative refractive index $\Delta_{cMAX}\%$ of the core region 104 is greater than the maximum relative refractive index $\Delta_{icMAX}\%$ of the inner clad region 106. For example, in one embodiment, the inner clad region 106 is pure silica-based glass. In yet another embodiment, the inner clad region 106 may comprise silica-based glass up-doped with $GeO_2$, $TiO_2$, or a similar up-dopant.

Referring again to FIG. 1A, the trench-overclad assembly 110 generally comprises a low-index trench region 112 which is surrounded by and in direct contact with a barrier layer 116. The barrier layer 116 is, in turn surrounded by and in direct contact with an overclad region 114. Each of the low-index trench region 112, the barrier layer 116, and the overclad region 114 are formed from silica-based glass.

The low-index trench region 112 is an annular region of silica-based glass which surrounds the core assembly 102. The low-index trench region 112 assists in improving the bend performance of optical fibers drawn from the optical fiber preform 100 and/or aids in increasing the effective area of the optical fiber. In embodiments where the optical fiber preform 100 includes an inner clad region 106, as depicted in FIG. 1A, the inner clad region 106 is positioned between the core region 104 and the low-index trench region 112 such that the low-index trench region 112 is spaced apart from the core region 104 (i.e., the low-index trench region 112 is not in direct contact with the core region 104). The low-index trench region 112 extends from the radius $R_{ic}$ to the radius $R_T$ such that the low-index trench region has a radial thickness $T_T = R_T - R_{ic}$.

In the embodiments described herein, the low-index trench region 112 generally comprises silica-based glass down-doped to lower the index of refraction of the low-index trench region 112 with respect to pure silica-based glass. For example, the low-index trench region 112 may be down-doped with fluorine in order to decrease the relative refractive index $\Delta_{TMIN}\%$ of the low-index trench region 112 with respect to pure silica-based glass. Accordingly, in the embodiments described herein, it should be understood that the relative refractive index of the low-index trench region is less than the relative refractive index $\Delta_{cMAX}\%$ of the core region 104 and the relative refractive index $\Delta_{icMAX}\%$ of the inner clad region 106.

The barrier layer 116 surrounds and is direct contact with the low-index trench region 112. In the embodiments described herein, the barrier layer 116 prevents diffusion of down-dopant from the low-index trench region 112 to the overclad region 114 which surrounds the barrier layer 116 when the trench-overclad assembly 110 is consolidated and doped, as will be described in more detail herein. In the embodiments described herein, the barrier layer 116 is formed from silica-based glass and generally has the same composition as the overclad region 114. Accordingly, in the relative refractive index profiles shown in FIGS. 1B and 1C, the relative refractive index of the barrier layer 116 is that of the overclad region 114. In the embodiments described herein, the barrier layer 116 has an as-formed density (i.e., prior to consolidation of the trench-overclad assembly) of greater than or equal to 1.5 g/cm³, more preferably greater than or equal to 1.75 g/cm³ and, even more preferably, greater than 2 g/cm³. The barrier layer 116 generally extends from the radius $R_T$ to the radius $R_B$ such that the barrier layer 116 has a radial thickness $T_B = R_B - R_T$. In the embodiments described herein, the radial thickness $T_B$ of the barrier layer 116 is generally greater than about 10 μm, more preferably greater than about 50 μm, even more preferably greater than about 100 μm. In some embodiments, the radial thickness $T_B$ of the barrier layer 116 is less than 100 μm. For example, the barrier layer 116 may be greater than or equal to about 10 μm and less than or equal to about 400 μm. In other embodiments, the barrier layer 116 may be greater than or equal to about 50 μm and less than or equal to about 400 μm. In still other embodiments, the barrier layer 116 may be greater than or equal to about 100 μm and less than or equal to about 400 μm. However, when the thickness of the barrier layer exceeds 2.0 g/cm³, the barrier layer 116 is effective for mitigating the diffusion of dopant irrespective of the thickness of the barrier layer. Accordingly, in these embodiments, it should be understood that a barrier layer of any thickness may be utilized.

Still referring to FIG. 1A, the overclad region 114 surrounds and is in direct contact with the barrier layer 116. The overclad region 114 generally extends from the radius $R_B$ to the radius $R_{oc}$ such that the overclad region 114 has a radial thickness $T_{oc} = R_{oc} - R_B$. The overclad region 114 generally has a relative refractive index $\Delta_{oc}\%$ relative to pure silica-based glass which is greater than the relative refractive index $\Delta_{TMIN}\%$ of the low-index trench region 112 and less than the maximum relative refractive index $\Delta_{cMAX}\%$ of the core region 104. In some embodiments, $\Delta_{oc}\% \geq \Delta_{ic}\%$, as depicted in FIG. 1B. Accordingly, the overclad region 114 may comprise pure silica-based glass ($SiO_2$) (i.e., silica-based glass which is substantially free from any dopants) or silica-based glass with one or more dopants which increase the index of refraction (e.g., $GeO_2$, $Al_2O_3$, $P_2O_5$, $TiO_2$, $ZrO_2$, $Nb_2O_5$, Cl, and/or $Ta_2O_5$), such as when the overclad region 114 is "up-doped," so long as the relative refractive index $\Delta_{oc}$% of the overclad region 114 is less than the maximum relative refractive index $\Delta_{cMAX}$% of the core region 104 and greater than the minimum relative refractive index $\Delta_{TMIN}$% of the low-index trench region 112.

Figure 2A:
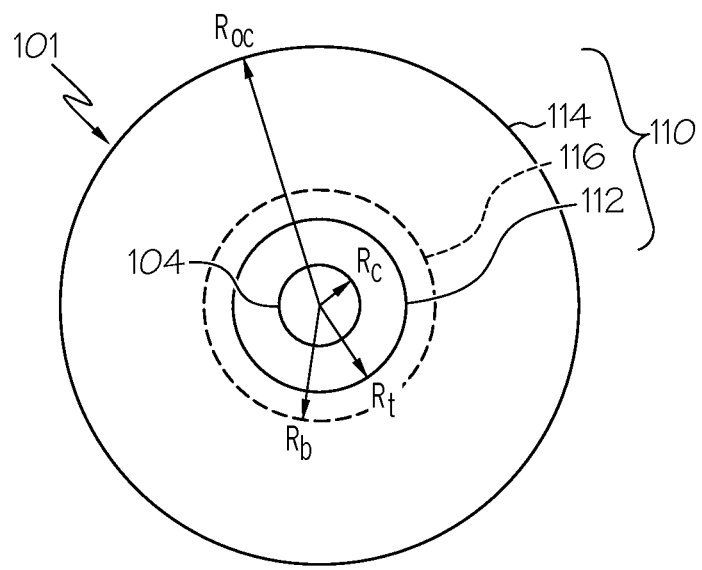
FIG. 2A schematically depicts a cross section of an optical fiber preform according to an alternative embodiment shown and described herein.
Figure 2B:
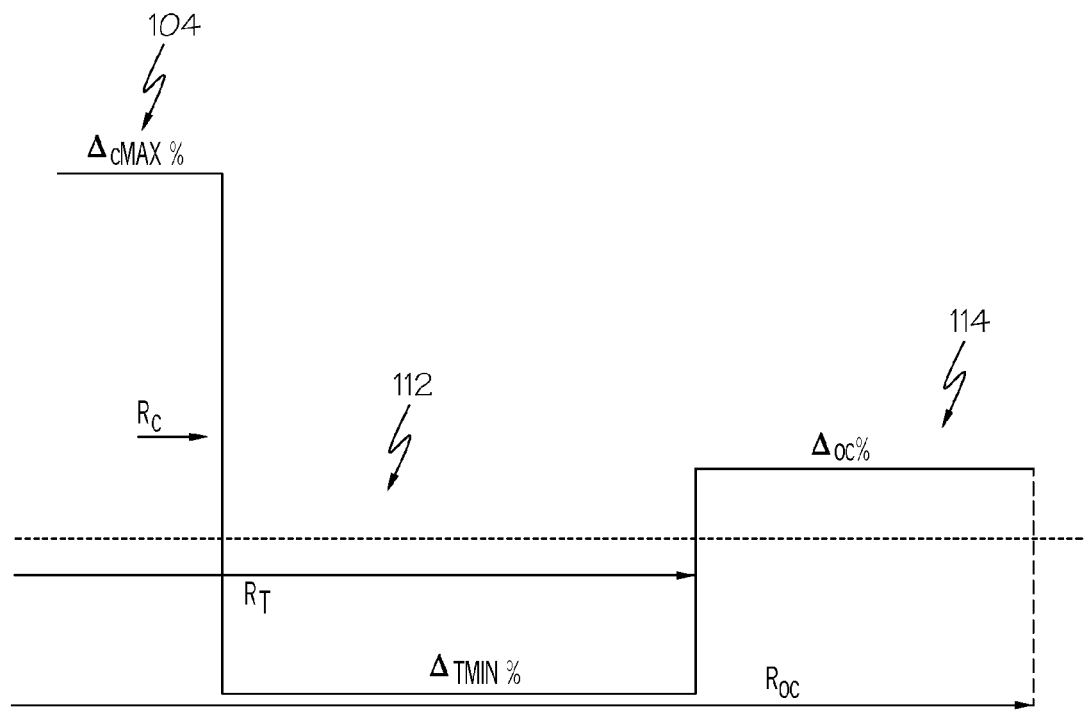
FIG. 2B schematically depicts a relative refractive index profile of the optical fiber preform of FIG. 2A according to one embodiment shown and described herein.

Referring now to FIG. 2A, another embodiment of an optical fiber preform 101 is schematically depicted. In this embodiment the core assembly is formed without an inner clad region. Accordingly, in this embodiment, the core region 104 is in direct contact with the low-index trench region 112, as shown in FIG. 2A. The core region 104 may be formed with a step refractive index profile, as depicted in FIG. 2B or, alternatively, with a graded refractive index profile, as described above. In this embodiment, the low-index trench region 112, the barrier layer 116, and the outer cladding 114 may be as described hereinabove with respect to FIG. 1A.

Methods for forming the optical fiber preforms 100, 101 depicted in FIGS. 1A and 2A will now be described in more detail with respect to FIGS. 3A-6. As noted hereinabove, the optical fiber preforms of the embodiments described herein are constructed from a core assembly and trench-overclad assembly which are separately formed and thereafter assembled to construct the optical fiber preform. In the embodiments described herein, each of the core assembly and the trench-overclad assembly are formed by depositing consecutive layers of silica-based glass soot on a bait rod using a vapor deposition process, such as the outside vapor deposition (OVD) process.

Referring to FIG. 3A by way of example, the low-index trench region 112 is formed by depositing silica-based glass soot on a bait rod 120. The silica-based glass soot is formed by providing a vapor phase silica-based glass precursor material, such as $SiCl_4$ or octamethylcyclotetrasiloxane (OMCTS), to a burner 122. The gas-fed burner 122 is supplied with fuel, such as $CH_4$, $D_2$ (deuterium), $CD_4$ or CO, and oxygen which are combusted to create flame 126. In some embodiments, the vapor phase silica-based glass precursor material is $SiCl_4$ and the gas-fed burner 122 is supplied with a fuel such as $D_2$, $CD_4$ or CO in order to limit the amount of residual OH in the deposited silica-based glass soot. Where such a combination is used to form the silica glass of the barrier layer, the interaction between the mode and any residual water in the barrier layer is mitigated. The vapor phase silica-based glass precursor material may be delivered to the burner at a flow rate from about 4 L/min to about 10 L/min while the fuel may be supplied to the burner at a flow rate from about 10 L/min to about 40 L/min.

The vapor phase silica-based glass precursor material is reacted in the flame 126 to produce silica-based glass soot 128 which is deposited on the bait rod 120 as the bait rod is rotated at a rate from about 150 rpm to about 400 rpm. In the embodiments described herein, the vapor phase silica-based glass precursor material used to form the trench region is substantially free from dopants and, as a result, the silica-based glass soot 128 deposited on the bait rod 120 is substantially free from dopants as it is deposited on the bait rod 120 to form the low-index trench region 112. The flame 126 of the gas-fed burner 122 is traversed at a first speed back and forth over the axial length of the bait rod 120 as indicated by arrow 124 as the bait rod is rotated thereby building up silica-based glass soot on the bait rod 120 and forming the low-index trench region 112. In the embodiments described herein, the traverse rate of the flame 126 is greater than 2 cm/s, preferably greater than or equal to 3 cm/s.

In the embodiments described herein, the silica-based glass soot is deposited on the bait rod 120 such that the low-index trench region 112 has a first density which is less than 0.6 g/cm³, preferably less than 0.5 g/cm³. As noted hereinabove, the silica-based glass soot 128 deposited to form the low-index trench region 112 is substantially free from any dopants which alter the index of refraction of the silica-based glass soot. Accordingly, it should be understood that the low-index trench region 112, as formed, is at least initially substantially free from dopants.

Referring to FIG. 3B, the barrier layer 116 is formed around the low-index trench region 112. The barrier layer 116 generally has a second density which is greater than the first density of the low-index trench region 112. As described above, the density of the barrier layer 116 is greater than or equal to 1.5 g/cm³, more preferably greater than or equal to 1.75 g/cm³ and, even more preferably, greater than 2 g/cm³ immediately following formation of the barrier layer 116. In one embodiment, the barrier layer 116 is formed around the low index trench region 112 by increasing a temperature of the flame 126 of the gas-fed burner 122 from the first temperature to a second temperature and decreasing the traverse speed of the flame of the burner from the first speed to a second speed. The temperature of the flame 126 can be increased by increasing the flow rate of the fuel and oxygen supplied to the gas-fed burner 122. In one embodiment, the temperature of the flame 126 of the gas-fed burner 122 is increased from the range of 1500° C.-2000° C. to greater than 2000° C. The traverse speed of the flame of the burner may be decreased from the first speed used to deposit the low-index trench region 112 to a second speed which is preferably less than 1 cm/sec, more preferably less than 0.5 cm/sec and, even more preferably, less than 0.25 cm/sec. Increasing the temperature of the flame 126 of the gas-fed burner 122 and decreasing the traverse speed of the flame increases the density of the soot deposited on the bait rod thereby forming a barrier layer 116 around the low-index trench region 112 which has decreased permeability.

In another embodiment, the barrier layer 116 is formed around the low-index trench region 112 by increasing a temperature of the flame 126 of the gas-fed burner 122 from a first temperature to a second temperature and reducing a concentration of the vapor phase silica-based glass precursor materials supplied to the gas-fed burner 122. For example, the flow of silica-based glass precursor materials may be decreased from approximately 4-10 L/min during the deposition of the low-index trench region 112 to less than 1 L/min during formation of the barrier layer 116. In one embodiment, the concentration of vapor phase silica-based glass precursor materials is decreased to zero. Reducing the concentration of the silica-based glass precursor material increases the flame temperature and slows or even halts (e.g., when the flow of silica-based glass precursor materials is zero) the deposition of silica-based glass soot over the low-index trench region 112. However, increasing the temperature of the flame 126 causes densification of the outer layer of silica-based glass soot of the low-index trench region 112 such that the outer layer of silica-based glass soot has a density which is greater than the density of the silica-based glass soot in the remainder of the thickness of the low-index trench region 112. This densified layer of soot forms the barrier layer 116. In this embodiment, the temperature of the flame 126 may be increased to 2000° C. or greater in order to densify the outer layer of silica-based glass soot of the low-index trench region.

In yet another embodiment, the barrier layer 116 may be formed around the low-index trench region 112 by increasing a temperature of the flame 126 of the gas-fed burner 122 from a first temperature to a second temperature and decreasing the traverse speed of the burner from a first speed to a second speed, as described above, while reducing a concentration of the vapor phase silica-based glass precursor materials in the carrier gas supplied to the gas-fed burner 122. As described above, reducing the concentration of the silica-based glass precursor material slows or halts the deposition of silica-based glass soot onto the low-index trench region 112, as described above. However, increasing the temperature of the flame 126 and decreasing the traverse speed of the flame 126 densifies the outer layer of silica-based glass soot of the low-index trench region 112 such that the outer layer of silica-based glass soot has a density which is greater than the density of the silica-based glass soot in the remainder of the low-index trench region 112. This densified layer of soot forms the barrier layer 116. In this embodiment, the temperature of the flame 126 may be increased to 2000° C. or greater in order to densify the outer layer of silica-based glass soot of the low-index trench region 112. In this embodiment, the traverse speed of the flame 126 is decreased from the first speed used to deposit the low-index trench region 112 to a second speed which is preferably less than 1 cm/sec, more preferably less than 0.5 cm/sec and, even more preferably, less than 0.25 cm/sec.

While in some embodiments described herein the barrier layer 116 is formed by heating deposited silica-based glass soot with a gas-fed burner to densify the soot, it should be understood that, in other embodiments, other heat sources may be used. For example, in an alternative embodiment, a $CO_2$ laser may be utilized to heat the outer layer of silica-based glass soot of the low-index trench region and thereby densify the soot.

Moreover, in some embodiments described herein, it is contemplated that the rate of rotation of the bait rod may be adjusted during formation of the barrier layer 116 in order to achieve a barrier layer having the desired density. Specifically, decreasing the rate of rotation of the bait rod may assist in increasing the density of the barrier layer.

Referring now to FIG. 3C, after the barrier layer 116 is formed around the low-index trench region 112, the overclad region 114 is formed around the barrier layer 116. In the embodiments described herein, the overclad region 114 may be formed in a similar manner as the low-index trench region 112. Specifically, vapor phase silica-based glass precursor material, such as $SiCl_4$ or OMCTS, is supplied to the gas-fed burner 122 and reacted in the flame 126 to form silica-based glass soot which is deposited on the bait rod 120 around the barrier layer 116 as the bait rod is rotated. The flame 126 of the gas-fed burner 122 is traversed at the first speed back and forth over the axial length of the bait rod 120 as indicated by arrow 124 as the bait rod is rotated, as described above, thereby building up silica-based glass soot on the bait rod 120 and forming the overclad region 114. The silica-based glass soot used to form the overclad region 114 may be pure silica-based glass soot (i.e., silica-based glass soot which is substantially free from dopants) or silica-based glass soot comprising one or more dopants for increasing the index of refraction of the overclad region 114.

The core assembly is separately constructed in a similar manner as the trench-overclad assembly. Specifically, silica-based glass soot corresponding to the core region of the preform is deposited on a bait rod utilizing an outside vapor deposition process as described above. The silica-based glass soot from which the core region is formed may be doped with a dopant which increases the index of refraction of the core region relative to pure silica-based glass (i.e., silica-based glass which is substantially free of dopants) or, alternatively, may comprise pure silica-based glass. The vapor phase silica-based glass precursor materials used to form the core region are provided to the burner along with a vapor phase dopant to achieve the desired up-doping of the core region. In embodiments where the core assembly further comprises an inner clad region, the inner clad region may be formed on the bait rod around the core region utilizing similar depositions techniques. As noted above, the inner clad region may be formed from pure silica-based glass or silica-based glass doped with an up-dopant or a down-dopant so long as the relative refractive index of the inner clad region is less than the relative refractive index of the core region.

Once the core assembly has been formed on the bait rod, the bait rod is removed from the core assembly and the core assembly is consolidated into solid glass. Specifically, the core assembly is first dried in a flowing dehydration gas, such as chlorine. Thereafter, the core assembly is heated to 1450° C. to sinter the core assembly into solid glass.

Figure 4:
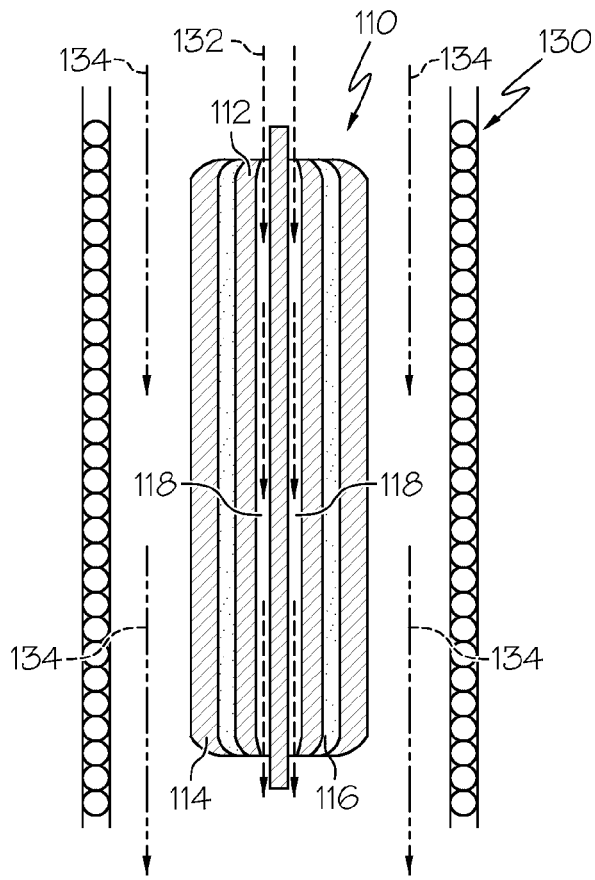
FIG. 4 schematically depicts the consolidation and doping of the trench-overclad assembly of an optical fiber preform according to one or more embodiments shown and described herein.
Figure 5:
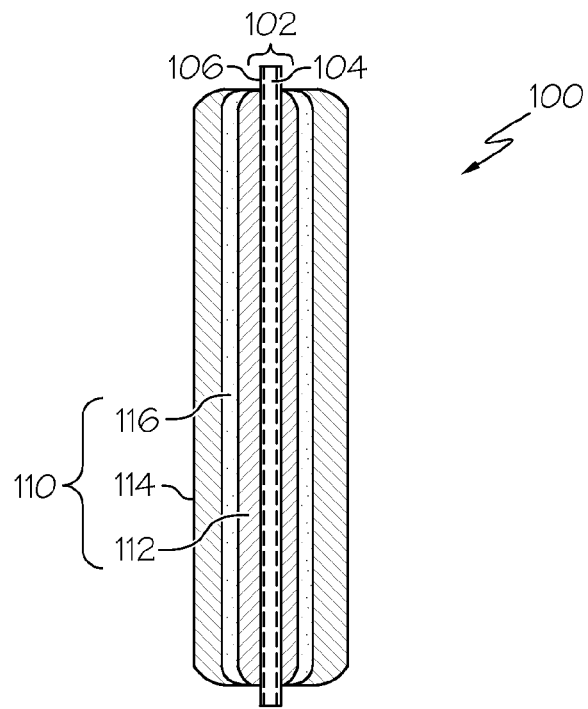
FIG. 5 schematically depicts the core assembly of an optical fiber preform inserted in the trench-overclad assembly of the optical fiber preform.

Referring now to FIG. 4, after the low-index trench region 112, the barrier layer 116 and the overclad region 114 have been deposited on the bait rod 120 thereby forming the trench-overclad assembly 110 of the optical fiber preform, the bait rod 120 is removed from the trench-overclad assembly 110 leaving a central channel 118 which extends through the trench-overclad assembly 110. The consolidated core assembly 102 is then inserted into the central channel of the trench-overclad assembly 110. When the consolidated core assembly 102 is positioned in the central channel left by the removal of the bait rod 120 there is a slight gap between the consolidated core assembly 102 and the low-index trench region 112 as the trench-overclad assembly has not yet been fully consolidated fully dense glass.

The trench-overclad assembly 110 and consolidated core assembly 102 are then placed in a consolidation furnace 130 where the trench-overclad assembly is consolidated to solid glass thereby adhering the trench-overclad assembly 110 to the core assembly 102. During consolidation, the trench-overclad assembly is first dried by flowing a dehydration gas between the consolidated core assembly and the trench-overclad assembly 110 (i.e., through the central channel 118) and around the exterior surfaces of the trench-overclad assembly 110. In one embodiment, the dehydration gas comprises a mixture of 2% to 6% chlorine gas in helium gas. The mixture is directed through and around the trench-overclad assembly at a flow rate of about 10 L/min to about 20 L/min as the trench-overclad assembly 110 is heated to a temperature from about 800° C. to about 850° C. for a period of up 1-2 hours. The flow of chlorine gas both through and around the trench-overclad assembly 110 facilitates drying both the low-index trench region 112 and the overclad region 114 in a single step.

Thereafter, the low-index trench region is doped by flowing a precursor gas 132 comprising a dopant, such as fluorine, through the trench-overclad assembly 110 in the central channel 118 as the trench-overclad assembly 110 and the consolidated core assembly 102 are heated to a temperature from about 1400° C. to about 1500° C. In one embodiment the precursor gas includes a mixture of a dopant, such as $SiF_4$ or $CF_4$ with He. In his embodiment, the mixture may include 25% dopant and 75% helium. The precursor gas is directed through the trench-overclad assembly 110 at a flow rate from about 0.1 to about 1.0 L/min. The precursor gas diffuses into the low-index trench region 112 thereby doping the low-index trench region 112 with fluorine. However, the increased density of the barrier layer 116 prevents the precursor gas from diffusing into the overclad region 114 and, as a result, contamination of the overclad region 114 with the precursor gas 132 is prevented. Moreover, because the core assembly 102 is fully consolidated, the precursor gas 132 does not diffuse into the core assembly 102 thereby preventing contamination of the core assembly 102.

In some embodiments, an inert muffle gas 134, such as helium, nitrogen or argon, is introduced into the consolidation furnace as the precursor gas 132 is directed through the trench-overclad assembly 110. The muffle gas is directed around the exterior surface of the trench-overclad assembly at a flow rate from about 20 L/min to about 50 L/min thereby diluting the precursor gas 132 which exits the central channel 118 and preventing the precursor gas from diffusing into the overclad region 114 from the outside of the trench-overclad assembly 110. Thereafter, the trench-overclad assembly is sintered into solid glass by down-driving the trench-overclad assembly 110 and the core assembly 102 through a hot zone of the consolidation furnace 130 at a rate of about 5 mm/min to 50 mm/min. The hot zone generally has a temperature from about 1400° C. to about 1500° C. Following the down-drive step, the trench-overclad assembly 110 and the core assembly 102 are a single, solid glass optical fiber preform 100.

Figure 6:
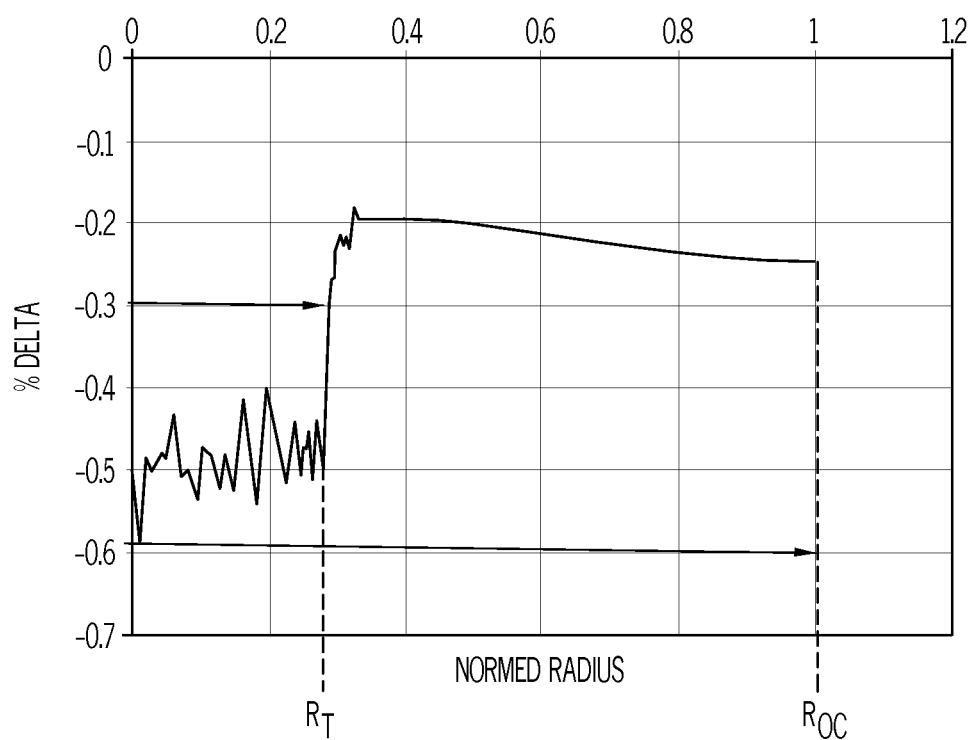
FIG. 6 schematically depicts the refractive index profile of the low index trench region and the overclad region of an optical fiber preform formed in accordance with the methods described herein.

Referring now to FIG. 6, an exemplary relative refractive index profile of the trench-overclad assembly is schematically depicted showing the relative refractive index of the low-index trench region 112 and the relative refractive index of the overclad region 114 as a function of the radial thickness of the trench-overclad assembly. As shown in FIG. 6, the barrier layer has prevented the precursor gas containing the down-dopant from diffusing from the low-index trench region 112 into the overclad region 114 and, as a result, the relative refractive index of the overclad region is substantially uniform throughout the radial thickness of the overclad region.

The preforms constructed as described herein may be drawn into optical fibers which have relative refractive index profiles similar to those shown in FIG. 1B, 1C or 2B.

EXAMPLES

The invention will be further clarified by the following example.

Example 1

A trench-overclad assembly with a barrier layer was made with an outside vapor deposition (OVD) process. The low-index trench region of the trench-overclad assembly was formed by depositing substantially pure silica-based glass soot onto a bait rod having an outer diameter of 9 mm. The silica-based glass soot was formed via a hydrolysis endothermic reaction of a vapor phase silica-based glass precursor material in a flame of a gas fed burner. The silica-based glass precursor material was $SiCl_4$ supplied to the burner at a rate from about 4 L/min to about 10 L/min. The flame was created by a mixture of $CH_4$ and $O_2$, each of which were supplied to the burner at a flow rate from about 10 L/min to about 40 L/min. The reaction of the $SiCl_4$ in the flame of the burner progressed according to the equation:

$$SiCl_4 + 2H_2O \rightarrow SiO_2 + HCl$$

As the silica-based glass soot was generated in the flame, the flame of the burner was traversed over the bait rod at a rate greater than about 2 cm/s while the bait rod was rotated at a rate of approximately 150 rpm to about 400 rpm thereby causing the soot to be deposited around the bait rod. The silica-based glass soot produced by this reaction was deposited on the bait rod such that the low-index trench region had a density of less than about 0.6 g/cm³.

Thereafter, the barrier layer was formed over the low-index trench region by decreasing the flow of the $SiCl_4$ into the burner to zero, thereby increasing the temperature of the flame. The increased temperature of the $CH_4/O_2$ flame fire-polished and densified the outer-most layer of soot of the low-index trench region to form a barrier layer with a density greater than 1.9 g/cc.

Thereafter, the overclad region was then deposited over the barrier layer. Specifically, the flow of vapor phase $SiCl_4$ to the burner was restored to a flow rate from about 4 L/min to about 10 L/min such that silica-based glass soot was deposited on the barrier layer to form the overclad region of the trench-overclad assembly.

The alumina bait rod was then removed from the trench-overclad assembly and a 9 mm diameter glass core cane assembly was inserted in the central channel left by the alumina bait rod. The core cane assembly was separately formed by an OVD process such that the core cane assembly had the desired refractive index profile. The trench-overclad assembly with the inserted core cane assembly was then loaded into a consolidation furnace for consolidation, including drying followed by F-sinter doping of the low-index trench region. Specifically, the drying was performed by flowing a mixture of 3% chlorine in 97% helium into the consolidation furnace for 60 minutes at a temperature of 1125° C. and a flow rate of 20 L/min. Thereafter, the low-index trench region was F-sinter doped by flowing a mixture of 25% $SiF_4$ in 75% helium through the central channel (i.e., between the core assembly and the low-index trench region) at a flow rate of 0.5 L/min, and flowing helium at a flow rate of 40 L/min through the bottom of the consolidation furnace to dilute any $SiF_4$ exiting the central channel. The trench-overclad assembly was then consolidated around the core cane assembly by down-driving the trench-overclad assembly into a sintering zone of the consolidation furnace at a rate of 5 mm/min with the center of the sintering zone at a temperature of 1450° C. thereby forming an optical fiber preform with a low-index trench region and an overclad region having refractive indices as indicated in FIG. 6.

Based on the foregoing, it should now be understood that the methods described herein can be utilized to form an optical fiber preform with a low-index trench region surrounding the core in a reduced number of steps. Specifically, forming a separate trench-overclad assembly with a dense barrier layer positioned between the low-index trench region and the overclad region permits the low-index trench region and the overclad region to be formed as one assembly and the low-index trench region to be down-doped without contaminating the overclad region with the down-dopant. This construct also allows the low-index trench region and the overclad region to be dried in a single step thereby eliminating water contamination in both regions. Accordingly, it should be understood that incorporation of the barrier layer in the trench-overclad assembly eliminates the need to separately form and consolidate the low-index-trench region and the overclad region.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming an optical fiber preform, the method comprising:
depositing silica glass on a bait rod thereby forming a trench region, wherein the silica glass is deposited such that the trench region has a first density, said first density being less than 0.6 g/cm$^3$;
forming a barrier layer of silica glass around the trench region, wherein the barrier layer of silica glass has a second density that is greater than the first density, said second density being at least 1.75 g/cm$^3$;
depositing silica glass around the barrier layer with the second density thereby forming an overclad region of a trench-overclad structure;
removing the bait rod from a central channel of the trench-overclad structure;
inserting a core structure into the central channel;
placing the trench-overclad structure with the core structure into a consolidation furnace;
heating the trench-overclad structure in the consolidation furnace to a temperature within a range from about 800° C. to about 850° C.; and
thereafter flowing a precursor gas comprising a down-dopant through the central channel of the trench-overclad structure while heating the trench-overclad structure in the consolidation furnace to a temperature within the range from about 1400° C. to about 1500° C., thereby doping the trench region with the down-dopant, wherein the layer of silica glass with said second density mitigates diffusion of the down-dopant from the trench region into the overclad region as the trench-overclad structure is heated to the temperature within the range from about 1400° C. to about 1500° C. thereby adhering the trench-overclad structure to the core structure and forming the trench-overclad structure and the core structure as a solid glass optical fiber preform.

2. The method of claim 1, wherein the preform comprises a core region.

3. The method of claim 1, wherein the preform comprises a core region surrounding and in direct contact with an inner clad region.

4. The method of claim 1, wherein:
depositing the silica glass of the trench region on the bait rod comprises reacting silica glass precursor materials in a flame of a gas-fed burner as the flame is traversed over the bait rod in an axial direction at a first speed, wherein the flame of the gas-fed burner has a first temperature; and
depositing the barrier layer of silica glass with the second density on the trench region comprises increasing a temperature of the flame of the gas-fed burner to a second temperature and decreasing a traverse speed of the flame to a second speed as silica glass precursor materials are reacted in the flame.

5. The method of claim 4, wherein the traverse speed of the gas-fed burner is decreased to the second speed of less than 1 cm/sec.

6. The method of claim 1, wherein:
depositing the silica glass of the trench region on the bait rod comprises reacting silica glass precursor materials in a flame of a gas-fed burner as the flame is traversed over the bait rod in an axial direction at a first speed, wherein the flame of the gas-fed burner has a first temperature; and
depositing the barrier layer of silica glass with the second density on the trench region comprises increasing a temperature of the flame of the gas-fed burner to a second temperature and reducing a flow of silica glass precursor materials supplied to the gas-fed burner as the flame is traversed over the bait rod.

7. The method of claim 1, wherein:
depositing the silica glass of the trench region on the bait rod comprises reacting silica glass precursor materials in a flame of a gas-fed burner as the flame is traversed over the bait rod in an axial direction at a first speed, wherein the flame of the gas-fed burner has a first temperature; and
depositing the barrier layer of silica glass with the second density on the trench region comprises increasing a temperature of the flame of the gas-fed burner to a second temperature, reducing a flow of silica glass precursor materials supplied to the gas-fed burner as the flame is traversed over the bait rod, and decreasing a traverse speed of the flame to a second speed.

8. The method of claim 1, wherein depositing the barrier layer of silica glass with the second density around the trench region comprises depositing the barrier layer of silica glass with the second density to a radial thickness greater than or equal to about 10 μm and less than or equal to about 400 μm.

9. The method of claim 1, further comprising flowing a muffle gas around an exterior of the trench-overclad structure as the precursor gas comprising a down-dopant flows through the trench-overclad structure thereby preventing the down-dopant from diffusing into the overclad region through an outer surface of the overclad region.

10. A method for forming an optical fiber preform, the method comprising:
depositing silica glass on a bait rod thereby forming a trench region, wherein the trench region has a first density of less than 0.6 g/cm$^3$;
forming a barrier layer of silica glass with a second density around the trench region with the first density, wherein the second density is greater than the first density, said second density being at least 1.75 g/cm$^3$, thereby forming an overclad region of a trench-overclad structure;
subsequently removing the bait rod from a central channel of the trench-overclad structure;
inserting a core structure into the central channel;
consolidating the trench-overclad structure around the core structure, the consolidating comprising down-driving the trench-overclad structure through a hot zone of a consolidation furnace having a temperature between about 1400° C. and about 1500° C.; and
during the consolidating, flowing a precursor gas comprising a down-dopant through the central channel of the trench-overclad structure as the trench-overclad structure consolidates around the core structure, thereby doping the trench region and forming an optical fiber preform.

11. The method of claim 10, wherein a radial thickness of the barrier layer of silica glass with said second density is from about 10 μm to about 400 μm.

12. The method of claim 10, wherein the down-driving the trench-overclad structure comprises down-driving the trench-overclad structure through the hot zone of the consolidation furnace at a rate between about 5 mm/min and about 50 mm/min.

13. A method for forming an optical fiber preform, the method comprising:
   reacting silica glass precursor materials in a flame of a gas-fed burner as the flame is traversed over a bait rod in an axial direction at a first speed thereby depositing silica glass on the bait rod thereby forming a trench region of the optical fiber preform, the trench region having a first density, said first density being less than 0.6 gm/cm$^3$;
   increasing a temperature of the flame of the gas-fed burner and decreasing a traverse speed of the gas-fed burner to a second speed thereby forming a barrier layer of silica glass with a second density around the trench region, wherein said second density is greater than said first density, said second density being greater than 1.75 gm/cm$^3$;
   depositing silica glass on the barrier layer of silica glass with a second density to form an overclad region of the optical fiber preform thereby forming a trench-overclad structure;
   removing the bait rod from a central channel of the trench-overclad structure;
   inserting a core structure into the trench-overclad structure;
   placing the trench-overclad structure with the core structure into a consolidation furnace; and
   thereafter flowing a precursor gas comprising a down-dopant through the central channel of the trench-overclad structure while heating the trench-overclad structure in the consolidation furnace, thereby doping the trench region with the down-dopant, adhering the trench-overclad structure to the core structure, and forming the trench-overclad structure and the core structure as a solid glass optical fiber preform, wherein the layer of silica glass with said second density mitigates diffusion of the down-dopant from the trench region into the overclad region.

14. The method of claim 13, wherein the traverse speed of the gas-fed burner is decreased to the second speed of less than 1 cm/sec.

15. The method of claim 13, wherein the core structure comprises a core region surrounded by an inner clad region.

16. The method of claim 13, wherein inserting the core structure into the trench-overclad structure comprises positioning the core structure in the central channel of the trench-overclad structure such that a gap exists between the core structure and the trench-overclad structure.

17. A method for forming an optical fiber preform, the method comprising:
   reacting silica glass precursor materials in a flame of a gas-fed burner as the flame is traversed over a bait rod in an axial direction at a first speed thereby depositing silica glass on the bait rod and forming a trench region, the trench region having a first density of less than 0.6 gm/cm$^3$;
   increasing a temperature of the flame of the gas-fed burner and reducing a concentration of silica glass precursor materials supplied to the gas-fed burner as the flame of the gas-fed burner is traversed over the bait rod thereby forming a barrier layer of silica glass with a second density around the trench region, wherein the second density is greater than the first density and is greater than 1.75 gm/cm$^3$; and
   depositing silica glass on the barrier layer of silica glass with said second density thereby forming an overclad region of a trench-overclad structure;
   removing the bait rod from a central channel of the trench-overclad structure;
   inserting a core structure into the trench-overclad structure to form a preform structure;
   placing the trench-overclad structure with the core structure into a consolidation furnace;
   heating the trench-overclad structure in the consolidation furnace to a temperature within a range from about 800° C. to about 850° C.; and
   thereafter flowing a precursor gas comprising a down-dopant through the central channel of the trench-overclad structure as the trench-overclad structure is heated in the consolidation furnace to a temperature within the range from about 1400° C. to about 1500° C. thereby down-doping the trench region with the down-dopant, adhering the trench-overclad structure to the core structure, and forming the trench-overclad structure and the core structure as a solid glass optical fiber preform, wherein the layer of silica glass with a second density prevents or mitigates diffusion of the down-dopant from the trench region into the overclad region of the trench-overclad structure.

18. The method of claim 17, further comprising decreasing a traverse speed of the flame of the gas-fed burner to a second speed.

19. The method of claim 18, wherein the traverse speed of the gas-fed burner is decreased to the second speed of less than 1 cm/sec.

20. The method of claim 17, further comprising forming the core structure prior to inserting the core structure into the trench-overclad structure.

21. The method of claim 17, a radial thickness of the barrier layer of silica glass with said second density is from about 10 µm to about 400 µm.

* * * * *